INVENTOR
Kenneth G. Williams

BY
ATTORNEY

INVENTOR
Kenneth G. Williams

BY [signature]

ATTORNEY

United States Patent Office 3,430,149
Patented Feb. 25, 1969

3,430,149

FREQUENCY CONTROL SYSTEM

Kenneth G. Williams, Silver Spring, Md., assignor to the United States of America as represented by the Secretary of the Navy Filed Dec. 22, 1965, Ser. No. 515,680
U.S. Cl. 328—134 6 Claims
Int. Cl. H03k 1/10, 3/26; H03b 3/04

ABSTRACT OF THE DISCLOSURE

A frequency control system with automatic slope control utilizes the binary outputs of two digital correlators to generate an analog voltage for operating a voltage-controlled variable frequency oscillator acting as a clock in a closed-loop servosystem. Coherent noise signals appearing at the two correlator inputs produce at the systems output a corrective voltage for the clock oscillator, while the incoherent noise signals existing at the systems input maintains an output memory voltage until a correction is needed. An automatic slope control feature of the system supplies a negative feedback in the control loop regardless of the phase relationship of the systems input signals.

Figure 1:
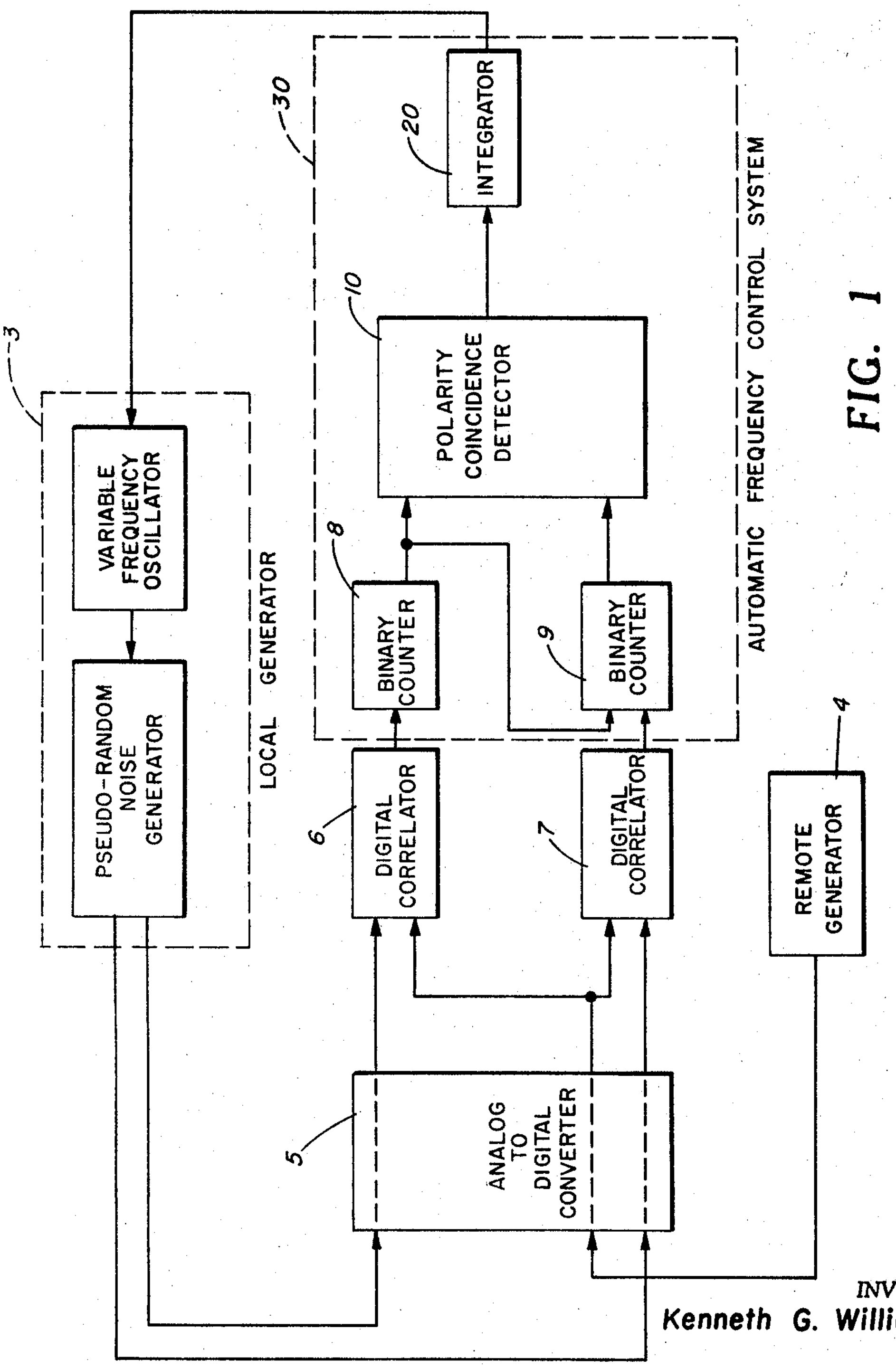

The invention described herein may be manufactured and used by or for the Government of the United States of America for governmental purposes without the payment of any royalties thereon or therefor.

This invention relates in general to a frequency control system employed in a closed loop lock-in system and more particularly to an automatic digital-to-analog frequency control system for providing a constant level control voltage to the local generator of a closed loop lock-in servocontrol system for maintaining synchronism between the locally generated signal and an incoming remote signal.

In the prior art, frequency control in relation to lock-in servocontrol systems has usually been achieved by an electromechanical system comprising a pair of synchronous A-C motors, a mechanical differential, a synchro transmitter and associated drive amplifiers. One synchronous motor is driven by the frequency to be controlled, the other by the reference frequency; the mechanical differential responds to the difference in speed of the two motors and, through the synchro transmitter, provides a signal which is amplified by the drive amplifiers and used to control the prime mover which drives the alternator set, or a variable speed transmission interconnecting the prime mover and the alternator. This type of control circuitry has been found to be very space consuming and difficult to operate due to the stringent requirements placed on the power supply and the control components to maintain the required accuracy. Digital control circuitry has heretofore been utilized to only a very limited extent due mainly to the complexity of the prior art devices which not only have required an analog-to-digital converter in the input stage of the control circuitry but have further required a digital-to-analog converter in the output stage.

The frequency control system of this invention was designed to operate in a closed-loop servosystem in conjunction with a digital correlator and a pseudo-random noise generator. The frequency control system utilizes the binary outputs of two digital correlators to generate an analog voltage for operating a voltage-controlled variable frequency oscillator acting as a clock in a closed-loop servosystem. Coherent noise signals appearing at the correlators' inputs produce at the device's output a corrective voltage for the clock oscillator, while the incoherent noise signals existing at the inputs maintain an output memory voltage until a correction is needed. An additional feature of the control circuit is an automatic slope control arrangement whereby the system is always supplied with a negative feedback in the control loop regardless of the phase relationship of the device's input signals.

An object of the present invention is the provision of a frequency control circuit which provides a constant level direct current output control voltage until the reference source and input source drops out of synchronization to produce a change in level at which level the system remains until further change is detected.

Another object is to provide a compact, simple and light-weight frequency control circuit without the attendant disadvantages realized in the prior art.

A further object of the invention is to provide a digital device which will operate on pulses or clipped signals which contain their information in the axis-crossings rather than in the signal amplitude.

Still another object is to provide an apparatus which will operate with extreme accuracy in spite of the stringent requirements placed on the power supply.

Figure 2:
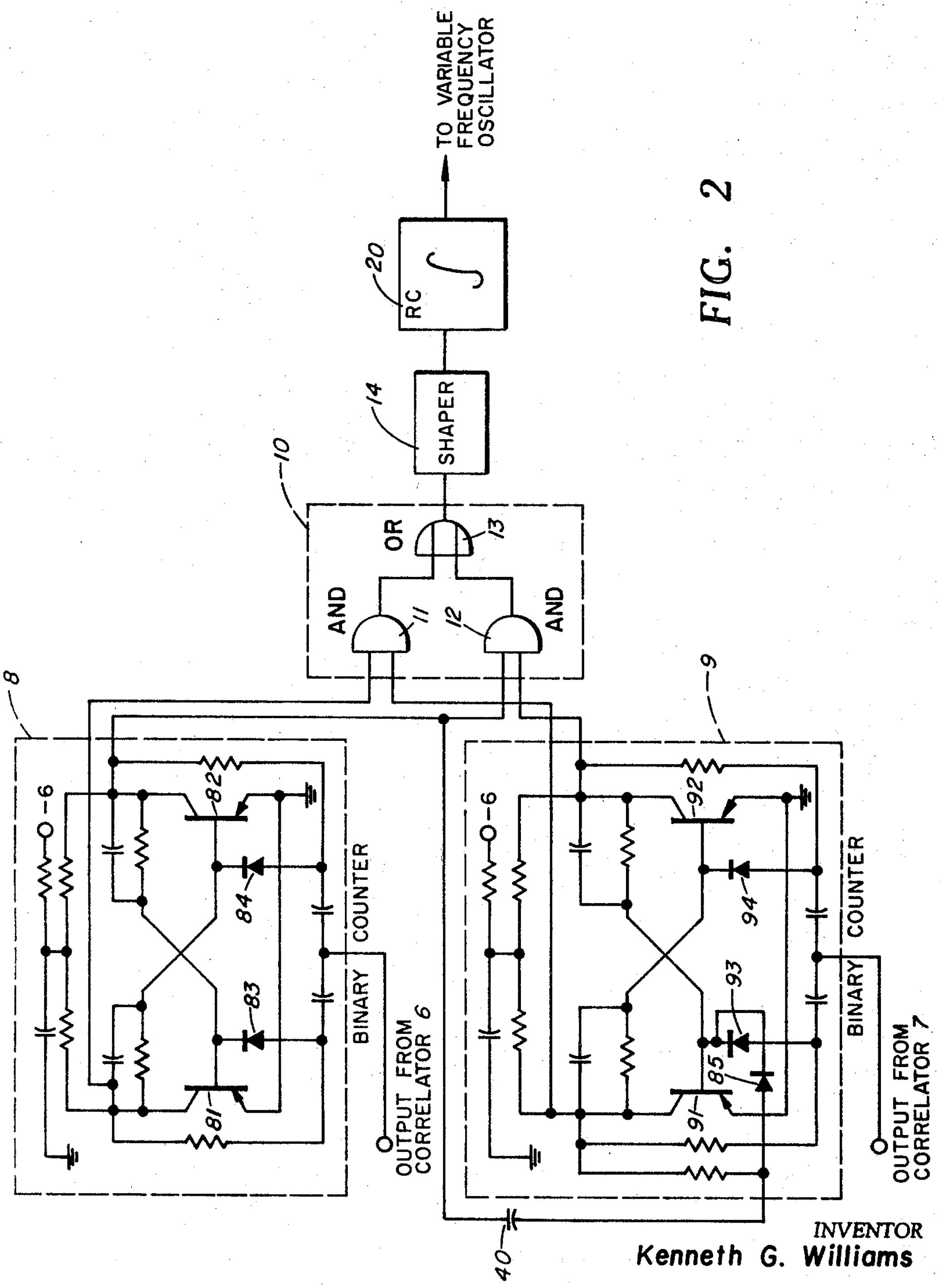

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 shows a block diagram of a lock-in servocontrol system utilizing the automatic frequency control system of this invention; and FIGURE 2 shows a circuit diagram of a typical automatic frequency control system as utilized in the invention.

Referring now to the drawings, there is shown in FIG. 1 a simplified lock diagram of the digital lock-in servosystem in which the frequency control system is a part. Before discussing the frequency control system and how it fits into the picture, a brief explanation will be given of the complete lock-in system. The purpose of the whole system is to produce a signal lock-in of a local pseudo-random noise generator shown as one stage of the local generator 3 with an incoming identical pseudo-random noise signal submerged in transmission noise from a remote generator 4. Lock-in is maintained automatically once it has been established by maintaining or varying the frequency of the variable frequency oscillator of the local pseudo-random noise generator in such a manner as to compensate for Doppler effects in the transmission path or to compensate for variations in frequency of the remote generator 4.

The local generator 3 produces a pair of pseudo-random time displaced complex signals which are converted into linear form in the analog-to-digital converter 5 and utilized as time-delayed and time-advanced reference signals in digital converters 6 and 7 respectively. The incoming remote signal from remote generator 4 is also a pseudo-random complex signal and it too is converted to binary form in the analog-to-digital converter 5. The above noted reference signals are time displaced with respect to the incoming remote signal if the signals from the local generator 3 and the remote generator 4 are in synchronism, then both the correlators 6 and 7 will indicate 0 percent correlation. If for any reason, however, the remote signal should start being delayed, this signal would start correlating with delayed reference signal applied to digital correlator 6. Correlator 7 would shown no change and continue to indicate 0%. Similarly if the remote signal should start advancing in time, correlator 7 would begin indicating a correlation greater than 0%, and correlator 6 would indicate incoherence or 0%. Either of these correlators will indicate 100% correlation if its local signal is exactly in phase with the incoming remote signal. The output from either correlator consists of a square wave of a definite width determined by the number of stages in the correlator and by the amount of coherency in the input signals to the correlator. A correlation of 0% will produce a square wave of definite width, while an increase in correlation will decrease the width of the output signal and the negative correlation increase would widen the output square wave.

The frequency control system 30 utilizes the information contained in the square waves from correlators 6 and 7 to produce a steady D-C voltage at its output to operate the variable frequency oscillator for the local pseudo-random noise generator. The frequency of the variable frequency oscillator is determined by the magnitude of the D-C voltage applied at its input in accordance with the correction signal provided by the integrator 20 of the automatic frequency control system 30. If, however, for some reason the remote signal tends to drift with respect to the local signal, then one or the other of the two correlators will show an increase in correlation as described above. This change in one of the inputs to the frequency control system 30 will cause its output to change to a new value in a direction determined by which correlator experienced an increase in its output. The local generator 3, driven by the frequency control system, changes to a new frequency to halt the shift in phase between the two pseudo-random noise signals.

The circuit diagram of the frequency control system 30 of FIG. 1 is shown in FIG. 2. The binary counters 8 and 9 at the inputs of the frequency control system, shown as single stage counters for illustration purposes only, are bistable multivibrators composed of transistors 81, 82, 91 and 92. The steering diodes composed of diodes 83, 84, 85, 93 and 94 are so connected that each incoming positive signal will cause that particular multivibrator or flip flop to change state. This gives a binary counting action and makes the output pulse twice as wide as the input square wave. The automatic slope control voltage is fed to binary counter 9 through steering diode 85. The output signals from the binary counters have an amplitude excursion from approximately 0 to —6 volts and are fed into a polarity coincidence detector 10 formed by the logic AND circuits 11 and 12 and OR circuit 13. The output signal from the OR circuit will appear timewise as a series of rectangular pulses and is fed to a shaper 14 which may, for example, be a bistable multivibrator. The shaper 14 acts to produce well formed and uniform but amplified reproductions of the detector output. The shaper output is fed directly into a simple RC integrating circuit, shown as integrator 20, where the average value of this output signal will appear for controlling the variable frequency oscillator of the local generator 3.

The frequency control system of FIG. 2 operates from two digital signals to produce an analog voltage to control the frequency of a variable frequency oscillator as shown in the block diagram of FIG. 1. It has several novel features among which is its memory feature described above where it retains or remembers its last output voltage until it is told to change to a new value. This memory feature results from the incoherence of the input signals to the two digital correlators. The corrective action taken by the frequency control systems' change to a new D-C voltage results from the coherence of the input signals appearing at the input of one of the digital correlators. Another unique feature of the frequency control system is the automatic slope control selector, to be described later, which automatically chooses a proper slope of the two available to provide negative rather than positive feedback in the loop system. The frequency control system is capable of changing over a wide range of control voltages and has an extremely linear response. The operation of the frequency control system may be understood by examining FIG. 2. If it is supposed that that digital system is locked in or that the signals to the inputs of the correlators are incoherent, then both inputs to the frequency control system will consist of square waves of equal widths. The binary counters will produce at their outputs square waves of twice the width of the input signals. These two output signals from the counters will bear a definite phase relationship to one another which will remain unchanged as long as the outputs of the two correlators are identical. The polarity coincidence detector will produce a series of rectangular pulses whose widths are determined by the relative phase of its two input signals. The RC integrator gives an output D-C voltage equal to the average value of the output signal of the polarity coincidence detector. This output voltage thus can assume any value between the peak-to-peak value of the rectangular wave going into the integrator. This control voltage with the variable frequency oscillator will remain constant as long as the relative phase of the signals from the binary counters remain the same.

If one of the digital correlators begins to indicate a correlation greater than 0%, as will be the case when the two pseudo-random noise generators drift slightly out of synchronism, its output square wave will shrink very slightly in width. This difference in width of the two output signals of the two correlators will cause these two signals to gradually change their phase relationship. This changing will continue until the two pseudo-random noise signals are back in phase again which in turn will cause the two correlator output signals to become the same width again. At this time a new phase relationship exists at the output of the binary counters and it will continue to exist until one of the correlators indicates a different percent correlation than the other one. This new phase relationship will produce a new pulse of greater width than previously by the output of the polarity coincidence detector and thus produce a new D-C voltage at the output of the RC integrator. This new control voltage for the variable frequency oscillator will remain indefinitely as long as the output of the two digital correlators remain the same.

A more detailed description of the operation of the automatic frequency control circuit is as follows. A positive input pulse applied to either flip-flop of binary counters 8 or 9 will pass through a diode within the respective flip-flop to change its state of conduction. Assume that the left hand of the flip-flop is the ONE state which is indicative of nonconduction of transistor 81 whereby the output is a negative pulse. The right hand side will be producing a positive pulse at its output which can be traced from the flip-flop of the binary counter 8 to the input of the flip-flop of binary counter 9. The positive pulse will pass through capacitor 40 and diode 85 to the base of the PNP transistor 91 of the flip-flop of binary counter 9, cutting off transistor 91 if it is conducting. The circuitry will not be affected if transistor 91 is not conducting. This will force this flip-flop of counter 9 into the ONE state whereby AND gate 11 receives the ONE outputs from both flip-flops and passes a signal indicative of the simultaneous occurrence of the two ONE outputs. In a similar manner, the other AND gate 12 passes a signal indicative of a simultaneous conduction of transistors 82 and 92 of binary counters 8 and 9, respectively.

The purpose of the automatic slope control will now be discussed. Let the case be considered where the output of the digital correlators are different so that the outputs of the binary counters are changing phase. As these two latter signals approach a coincidence or zero time difference, the output voltage of the frequency control system is approaching a minimum value in thus decreasing on a negative slope. As these signals approach a time delay difference of half the period, the output voltage is approaching a maximum value or increasing on a positive slope. Since this output control voltage is employed as a feedback voltage in a closed loop system, it is obvious that one of these slopes, the one producing positive feedback, must be eliminated. This is accomplished by connecting the output of binary counter 8 to a steering circuit in the input of the second binary counter 9. This connection permits the inputs signals to the polarity coincidence circuit 10 from ever being more than half a period out of phase with each other. This coupling between the two binary counters has no effect on the second counter as long as the phase of the input signals is less than half a period. But if the two signals drift beyond half a period, then the output binary counter 8 will trip binary counter 9 inverting the latter's output signal. This inversion thus throws the phase relationship of the two signals back to less than a half a period. Thus the proper slope is established and maintained for the feedback loop regardless of the relative phase of the signals coming from the digital correlators or regardlass of any spurious triggering of the binary counters.

While certain definite polarities and specific connections have been described during the course of the specification, it is to be specifically understood that different polarities in connections may be made without altering the operation of this circuit of this invention.

Obviously many modifications and variations in the present invention are possible in light of the above teachings. It is therefore to be understood that within the scope of the appended claims the invention may be practiced otherwise than as specifically described.

What is claimed is:

1. A digital memory frequency control circuit comprising:

first and second input pulse sources;

detecting means having at least a pair of input terminals and an output terminal, whereby an output signal is produced indicative of a change in one of the input signals from the input pulse sources with respect to the other, said dectecting means including a logic gate network comprising a pair of AND gates the outputs of which are connected to an OR gate such that one of the AND gates will pass a signal of a preselected level which is indicative of the simultaneous occurrence of input pulses from the first and second input pulse sources to the detecting means and such that the other AND gate will pass a signal of a preselected level different from that characteristic of the first AND gate, which is indicative of the absence of a signal from both input pulse sources;

means for connecting said first and second input pulse sources to respective input terminals of said detecting means;

means for producing a linear control function by summing the output signals from said detecting means over a predetermined period of time;

and means for interconnecting the output terminal of said detecting means and said linear control means.

2. The digital memory frequency control circuit as set forth in claim 1 wherein the means for producing a linear control function includes an RC integrator.

3. A digital memory frequency control circuit as set forth in claim 1 wherein the means for interconnecting the output terminal of the detecting means and the linear control means includes a shaping circuit for producing a well formed, uniform and amplified reproduction of said detecting means output.

4. A digital memory frequency control circuit as in claim 1 wherein the means for connecting the first and second input pulse sources to respective input terminals of the detecting means includes an automatic slope control network for maintaining the proper slope of the control signals appearing at the output of the linear control means regardless of the relative phase of the signals coming from the input pulse sources; said automatic slope control network including a first and second binary counter, the first counter connected to the first input pulse source and responsive to an input signal therefrom and the second counter connected to the second input pulse source and responsive to a signal therefrom; and wherein each said binary counter comprises a ZERO and a ONE output terminal and a trigger input terminal which receives the input signals from its respective input pulse source for switching the counters from one state to the other, a steering gate connected from the output ZERO terminal of the first counter to a second input terminal of the second counter whereby a signal will appear at the output ONE terminal of the second counter regardless of whether an input from the second input pulse source is present at the trigger input which thereby affects the establishment and maintenance of the proper slope function required at the output of the linear control means.

5. A digital memory frequency control circuit as set forth in claim 4 wherein said detecting means includes a logic gate network comprising first and second AND gates the outputs of which are connected to an OR gate such that the first AND gate passes a signal through the OR gate upon the occurrence of a ONE output from both binary counters and the second AND gate passes a signal through the OR gate only upon the occurrence of a ZERO output from both binary counters whereby the resultant output of the detecting means is summed in the linear control means over a predetermined period of time.

6. A digital memory control circuit as set forth in claim 5, wherein the linear control means includes an RC integrator.

References Cited

UNITED STATES PATENTS

| | | | |
|---|---|---|---|
| 3,054,062 | 9/1962 | Vonarburg | 328—133 |
| 3,134,076 | 5/1964 | Haner et al. | 328—133 |
| 3,164,777 | 1/1965 | Guanella | 328—134 |
| 3,187,195 | 6/1965 | Stefanov | 328—133 X |
| 3,328,688 | 6/1967 | Brooks | 328—133 X |
| 3,328,719 | 6/1967 | De Lisle et al. | 331—17 |

ARTHUR GAUSS, *Primary Examiner.*

S. D. MILLER, *Assistant Examiner.*

U.S. Cl. X.R.

328—5, 127; 307—232, 233, 218, 229, 271, 291